June 12, 1962     I. MAVROVIC     3,038,285
METHOD FOR COMPRESSING UREA SYNTHESIS OFF-GAS
Filed March 18, 1960
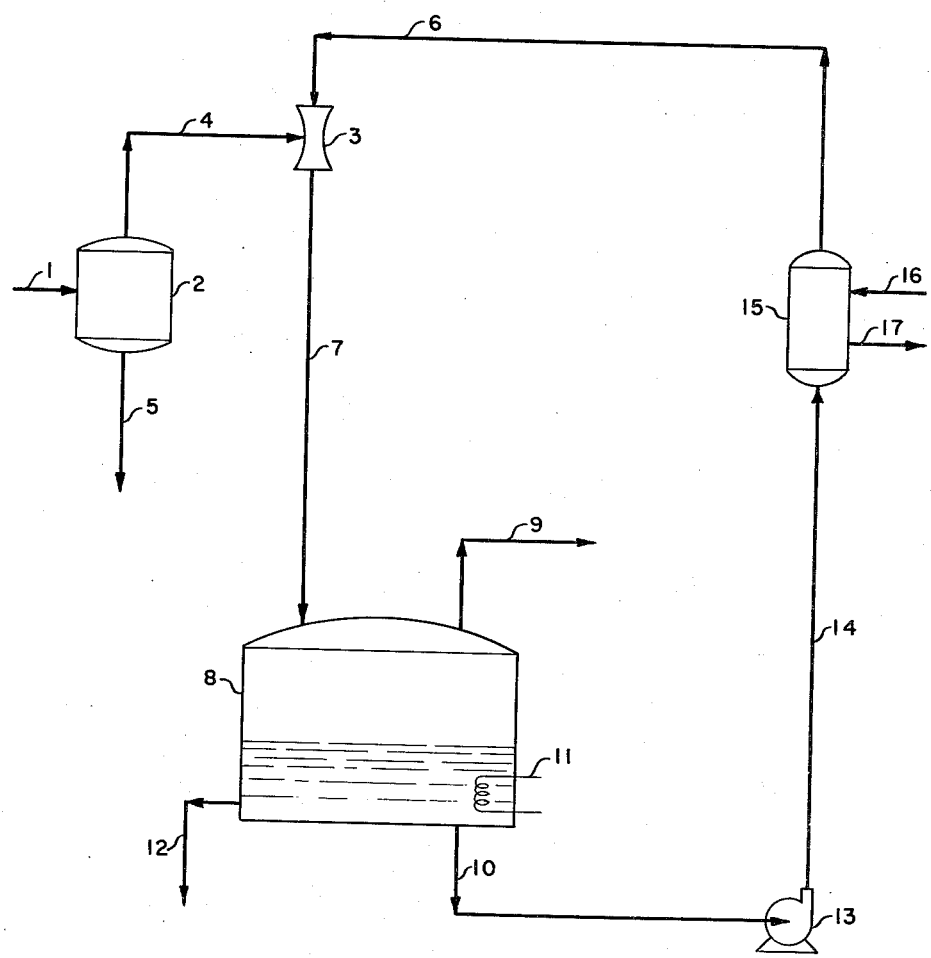
IVO MAVROVIC
*INVENTOR.*
BY J. T. Chaboty
*AGENT*

United States Patent Office 3,038,285
Patented June 12, 1962

3,038,285
METHOD FOR COMPRESSING UREA
SYNTHESIS OFF-GAS
Ivo Mavrovic, New York, N.Y., assignor to Chemical Construction Corporation, New York, N.Y., a corporation of Delaware
Filed Mar. 18, 1960, Ser. No. 16,076
7 Claims. (Cl. 55—48)

This invention relates to urea synthesis processes in which a mixed off-gas stream containing ammonia, carbon dioxide and water vapor is produced. A method has been developed, which accomplishes the compression of the mixed off-gas stream to a higher pressure level, prior to recycle or other process utilization.

The synthesis of urea is generally carried out by reacting ammonia with carbon dioxide at high pressure and somewhat elevated temperature. The non-catalytic reaction proceeds through the intermediate formation of ammonium carbamate, followed by partial dehydration to urea. Thus the effluent from the high pressure reactor usually contains unreacted excess ammonia, ammonium carbamate and water, as well as product urea. Numerous procedures have been developed for the separation or recycle of the unconverted components. In most instances the ammonium carbamate is decomposed to ammonia and carbon dioxide, and an off-gas is subsequently removed which contains ammonia, carbon dioxide and water vapor. An additional off-gas of similar composition is also withdrawn from the product urea solution.

These off-gases contain significant amounts of ammonia and carbon dioxide, and consequently recycle to the process or other off-gas utilization is essential. However, the handling of this mixed gas stream presents numerous problems. One major problem involves the compression of this gas stream. Even moderate pressure increases have been difficult to achieve, because of the great tendency of the gas stream components to recombine thus forming ammonium carbamate. This compound exists as a solid at ordinary pressures, and consequently conventional gas compressors cannot be used with this gas stream since solid carbamate forms inside the units resulting in malfunction and plugging. One attempted solution to the problem has been to provide special compressors adapted to operate at elevated temperatures, in order to maintain the ammonium carbamate in the gas phase. However, in general this approach has been found to be unsatisfactory, due to high maintenance requirements. The gas stream is quite corrosive, especially at elevated temperatures. As a result, it has been found that compressors in this service require frequent repair and overhaul, and the commercial utilization of gas compressors for this purpose is generally conceded to be impractical.

Other approaches to off-gas handling and utilization may be mentioned. In numerous installations, the off-gas is passed to an ammonium nitrate or ammonium sulfate facility, and contacted with the respective acid to recover ammonia values by forming the fertilizer salt. In these cases, the particular pressure level of the off-gas stream is of minor consequence and compression is not required.

Finally, some processes are known where the off-gas is absorbed to form a dilute liquid recycle solution, or in which the ammonium carbamate is condensed as a solid and recycled in a slurry. It will be evident that these processes avoid the problem of gas recompression, however, overall process efficiencies are limited by the introduction of water or other inert liquid into the synthesis circuit.

In the present invention, the pressure level of a mixed off-gas containing ammonia, carbon dioxide and water vapor is raised in a remarkably effective and trouble-free manner. The off-gas, at any particular pressure level, is aspirated into a circulating aqueous liquid stream, preferably by the use of a liquid jet exhauster. The liquid stream best adapted for this purpose is simply an aqueous solution containing ammonia and carbon dioxide in equilibrium with the off-gas. The resulting mixed gas-liquid stream, at the desired higher pressure, is then passed to suitable gas-liquid separation means such as a surge tank, and the off-gas is withdrawn from the tank at the desired higher pressure level. The liquid solution is recycled back through the jet aspirator unit for further gas compression.

This process has several advantages as compared to conventional gas compression. Since solid ammonium carbamate cannot form, the process is not subject to plugging and may be operated in a continuous manner for long periods of time. In addition, corrosion is not a problem because relatively low temperature levels are maintained. The system is simple to install and operate, and standard units may be used throughout. Finally, the system is flexible and adaptable to various pressure levels and gas flows as encountered at various points in urea processes.

It is an object of the present invention to compress off-gas derived from urea synthesis processes.

Another object is to raise the pressure level of mixed gas streams containing ammonia, carbon dioxide and water vapor, derived from urea synthesis processes.

A further object is to compress mixed gas streams containing ammonia and carbon dioxide without the formation of solid ammonium carbamate.

Still another object is to recover, at an elevated pressure, an off-gas containing ammonia and carbon dioxide values from the product solution produced in a urea synthesis process.

An additional object is to raise the pressure of urea synthesis off-gas to a suitable level for recycle processing.

These and other objects and advantages of the present invention will become evident from the description which follows.

Referring to the FIGURE, urea process stream 1 is passed into flash or holdup vessel 2. Stream 1 may be either an intermediate process stream containing a gas phase derived from ammonium carbamate decomposition, or the product urea solution produced by the process. In vessel 2 the process stream 1 is subjected to the aspirating action of liquid jet exhauster 3, acting through line 4. An off-gas containing ammonia and carbon dioxide and water vapor is drawn off from vessel 2 through line 4, while the liquid solution stream leaves via 5.

Jet exhauster 3 operates on a well-known aspiration principle, employing high pressure liquid stream 6 to provide motive action. Stream 6 passes through the restricted section of unit 3, and due to increased velocity a suction is generated which serves to entrain off-gas stream 4 into the liquid stream passing through unit 3. The resulting mixed gas-liquid stream leaves unit 3 via 7 at an elevated pressure which is somewhat lower than the pressure in line 6. Although there is no theoretical limitation on the pressure of stream 7, practical considerations of power requirements as well as requisite pressure levels for off-gas recycle processing will, in general, limit the pressure of stream 7 to a magnitude up to about 200 p.s.i.g.

Stream 7 now passes into separator vessel 8, in which the mixed stream is separated into gas and liquid components. The gas phase is withdrawn via 9 at the desired elevated pressure, while the liquid phase is collected within vessel 8 and subsequently recycled via 10. Heating coils 11 may be provided within vessel 8 to facilitate separation of gas from liquid. It will be evident that, at equilibrium, high pressure gas stream 9 will be identical in composition with stream 4, and thus the desired compression will have been achieved. However, in some cases, depending on the composition of stream 4, a small portion of stream 4 may remain in the liquid phase within vessel 8. The excess liquid may be drawn off via 12 and separately treated or recycled to urea synthesis.

The recycle liquid stream 10 is compressed in pump 13 and passed via 14 to cooler 15 where it is cooled as required, with cooling water admitted via 16 and removed via 17. In some cases cooler 15 may be omitted. The compressed recycle liquid stream now passes via 6 to the jet exhauster 3.

The recycling liquid solution preferably consists of an aqueous solution containing dissolved ammonia and carbon dioxide in equilibrium with the particular off-gas being treated. However, in some cases it may be more desirable to use other aqueous solution such as ammonium nitrate, ammonium sulfate or sodium carbonate in order to modify the equilibrium content of the gas stream 9, especially when excess liquid solution is withdrawn via 12.

The primary function of jet exhauster 3 is to provide an aspiration effect relative to the pressure level in vessel 2, thus preferably unit 3 may be any one of several well-known devices operating on the jet exhauster principle or equivalents. In some cases a venturi or orifice-type device may be employed for this purpose; however, the efficiency of the apparatus in this case will usually be somewhat lower than a comparable jet exhauster. In any case it should be understood that the gas pressure in line 4 may be either superatmospheric or may be somewhat below atmospheric due to the aspiration effect. The net result of the process in all instances will be to produce a mixed gas stream 9 containing ammonia and carbon dioxide values which is at a higher pressure than the original gas stream 4.

An example of an industrial application of the present invention will now be described. Product urea solution, obtained at 20 p.s.i.g. and 200° F., was passed into vessel 2 and subjected to a subatmospheric pressure of about 12 p.s.i.a. Flash removal of an off-gas took place. This off-gas contained, by weight, 35% ammonia, 35% water vapor and 30% carbon dioxide, and was produced at the rate of 200 pounds per hour. The off-gas passed into the jet exhauster where it was compressed and mixed with an aqueous solution containing about 13% carbon dioxide and 15% ammonia by weight. This solution was essentially an aqueous ammonium carbamate solution in equilibrium with the off-gas, and was passed through the jet exhauster at the rate of 600 gallons per minute. Inlet solution pressure was 135 p.s.i.a, and the outlet pressure of the resulting mixed gas-liquid stream was 35 p.s.i.a. The mixed stream was passed into a gas-liquid separator vessel maintained at 190° F. by steam coils, and the product off-gas was drawn off at 35 p.s.i.a. and 190° F. and passed to a recycle system operating at this pressure level, for eventual return to urea synthesis. Liquid solution was withdrawn from the separator vessel at the requisite 600 g.p.m. rate, compressed to 135 p.s.i.a., cooled and recycled to the jet exhauster. The system thus recovered and recycled about 70 lbs./hr. of ammonia and 60 lbs./hr. of carbon dioxide in a mixed gas stream at 35 p.s.i.a.

Variations and modifications of process steps will occur to those skilled in the art, and consequently this invention should not be limited to the above example.

I claim:

1. Method of compressing a urea synthesis off-gas stream containing ammonia, carbon dioxide and water vapor to elevated pressure which comprises aspirating said off-gas into a high pressure aqueous liquid solution whereby the pressure of said liquid solution is reduced and a mixed gas-liquid stream is formed at elevated pressure, dividing the mixed stream of gas and liquid at elevated pressure into separate gas and liquid phases, removing said gas phase at elevated pressure as compressed off-gas, pumping said liquid phase to high pressure, and recycling said liquid phase to said aspiration step as said high pressure aqueous liquid solution.

2. Method of claim 1, in which said off-gas is obtained from the final aqueous urea solution produced in a urea synthesis process.

3. Method of claim 1, in which said aqueous liquid solution consists of water containing dissolved ammonia and carbon dioxide.

4. Method of claim 1, in which high pressure gas separation from liquid solution is accomplished by gravity separation of gas from liquid combined with heating of the separated liquid phase.

5. Method of recovering and compressing an off-gas stream containing ammonia and carbon dioxide values from product urea solution in a urea synthesis process which comprises removing an off-gas from said solution by decreasing the pressure over said solution, aspirating said off-gas into a high pressure aqueous ammonium carbamate solution, dividing the mixed stream of gas and liquid into separate gas and liquid phases at an elevated pressure below about 200 p.s.i.g., removing said gas phase as compressed off-gas, compressing said liquid phase, and recycling said liquid phase to said aspiration step.

6. Process of claim 5, in which said liquid phase is cooled prior to recycling to said aspiration step.

7. Process of claim 5, in which the pressure over said product urea solution is decreased to a subatmospheric level for the removal of said off-gas.

References Cited in the file of this patent

UNITED STATES PATENTS

| | | |
|---|---|---|
| 584,767 | Bourdon | June 22, 1897 |
| 2,267,133 | Porter | Dec. 23, 1941 |
| 2,723,001 | Hoff | Nov. 8, 1955 |
| 2,808,125 | Buck et al. | Oct. 1, 1957 |
| 2,853,149 | Gosselin | Sept. 23, 1958 |
| 2,904,393 | Frejacques | Sept. 15, 1959 |
| 2,913,493 | Sze et al. | Nov. 17, 1959 |
| 2,947,379 | Aubrey | Aug. 2, 1960 |
| 3,005,849 | Otsuka | Oct. 24, 1961 |